United States Patent [19]
McKindree

[11] 3,871,245
[45] Mar. 18, 1975

[54] CONNECTION ROD BEARING FOR INTERNAL COMBUSTION ENGINES

[76] Inventor: Delbert R. McKindree, 309 Ridge Ave., Butler, Pa. 16001

[22] Filed: Mar. 25, 1974

[21] Appl. No.: 454,569

[52] U.S. Cl. .................................. 74/579 E, 308/78
[51] Int. Cl. .............................................. F16c 7/02
[58] Field of Search.......... 74/579 E, 579, 587, 594, 74/605; 308/78

[56] References Cited
UNITED STATES PATENTS

| | | | |
|---|---|---|---|
| 1,377,866 | 5/1921 | White | 308/78 |
| 1,869,412 | 8/1932 | DeVore | 74/579 E X |
| 2,079,987 | 5/1937 | Cooper | 74/587 |
| 2,419,408 | 4/1947 | Lightowler | 74/605 |

Primary Examiner—Samuel Scott
Assistant Examiner—F. D. Shoemaker
Attorney, Agent, or Firm—Parmelee, Miller, Welsh & Kratz

[57] ABSTRACT

An internal combustion engine connecting rod, designed to eliminate a connecting rod insert bearing about the engine crank to which it is connected, has a crank engaging end providing an opening through which the crank passes formed, in part, by an integral yoke-like portion on the connecting rod and a complementary cap portion fixed to the yoke-like portion. The diametrically opposed surfaces of the opening each provide an integral bearing quadrant having a working fit against the crank. The surfaces of the yoke and cap at each side of the plane of separation between the yoke and the cap, i.e., between said bearing quadrants, are recessed to be clear of the crank and provide open-ended grooves, into which lubricant flows intermittently from a lubricant discharge port in the crank when the crank rotates in the crank shaft end of said connecting rod.

4 Claims, 3 Drawing Figures

CONNECTION ROD BEARING FOR INTERNAL COMBUSTION ENGINES

This invention is for an improvement in a connecting rod bearing for internal combustion engines of the reciprocating piston type as disclosed in my copending application Ser. No. 233,100, filed Mar. 9, 1972 now U.S. Pat. No. 3,801,173. Any relevant parts of said application are included herein by reference. The present invention is designed to enable the compression ratios of engines to be substantially increased by elimination of insert bearings but without significant change in the weight or size of the connecting rods.

Trouble with effective lubrications of the connecting rod bearing and the crank which in encircled in the early days of motoring led to the use of a replaceable insert bearing in the crank engaging end of a connecting rod. This was largely because the liner could permit some slight space between the connecting rod and crank to retain oil as the connecting rod dipped into the oil in the engine crank case, and, when the insert bearing became too loose under the pounding to which it was subjected at the top and bottom limits of travel of the connecting rod, the liner could be replaced.

Although forced lubrication of connecting rod bearings later came into use, connecting rod insert bearings or liners continued to be used, although they were modified to adapt them to forced flow lubrication.

In automobile and other engines designed to operate at relatively high speeds, the weight of the moving parts of the engine is a material factor and wherever possible the size and weight of connecting rods and connecting rod bearings have been decreased. While it was recognized that high compression ratios increased efficiency and reduced pollution by more completely burning the fuel, the failure of connecting rod insert bearings particularly has resulted in the industry compromising by adopting relatively low compression ratio engines, although some engines designed for use with leaded gasoline have a higher compression ratio than those designed for "regular" or lower octane fuel.

It is, of course, well known that, as the compression ratio is increased, the octane rating of the fuel must be increased to prevent premature ignition of the fuel from the heat of compression as well as from the residual heat of the engine and thereby slow down the burning rate of the fuel and thereby insure complete combustion. Therefore, pollution due to improper combustion of fuel is greater in low compression ratio engines, which is an important reason, in addition to fuel economy, to go to higher compression ratios.

Diesel engines are designed with a view to the developing of power, and speed is less important. They do operate at high compression ratios with low volatile slow-burning fuels, but the connecting rods, connecting rod bearings, and crank shafts are made heavy and with large bearing areas to reduce the pressure per unit of area such that the connecting rod insert bearings will ordinarily stand up for reasonably long periods of tine. However, it is not unusual that connecting rod insert bearings need replacement from time to time. It is not an unusual practice for operators of Diesel driven equipment to turn their engines in after a period of time for a rebuilt one to avoid loss of time because of bearing failure. This is good practice notwithstanding the much more massive parts from which said engine are built.

The present invention reverts to the simple expedient of eliminating any insert bearings between the connecting rod and the crank whereby the metal of the connecting rod contacts directly the metal of the crank. Diametrically positioned open-ended grooves in the connecting rod, one at each side of the crank, extend in a direction parallel with the axis of the crank across the bearing surface of the connecting rod. Lubricant is supplied under pressure in the usual way axially of the crank to a radial passage which opens momentarily into one or the other of these oil grooves with each half revolution of the crank in the bearing.

In a multiple-cylinder four-cycle engine, one groove in a four-cycle engine will always be moving to a position to receive oil from its crank as another is moving out of such position so that the oil pressure in the system keeps reasonably uniform, even at high speeds, and in a six or eight-cylinder engine, where two cranks are always in the same position but 360° removed with respect to each other from firing position, there may be always two cranks about to receive oil from the radial passage as two others are moving out of oil-receiving position, whereby the oil pressure in the system will therefore still be reasonably uniform at all times, as more fully explained in said copending application.

Important to this invention is the provision of the oil grooves at opposite sides of the crank with the quadrants at the tops and bottom of the connecting rod bearing making full working contact with the crank. There is little pressure between the crank and connecting rod sideways, that is at the "three" and the "nine o'clock" positions, and maximum pressure developes between these parts at vertically-opposite points, i.e., the "six" and "twelve o'clock" positions, so that the oil grooves are only located in areas of low pressure where the pressure between the crank and bearing surfaces is minimal, and the strength of the metal to resist maximum or vertical pressures is not impaired.

My invention, by eliminating the softer and less pressure-resistant liners, and by providing for lubrication with out looseness that does not allow even a slight "slap" or pounding, enables high-speed engines to operate at much higher compression ratios without increase in the size of the connecting rod bearings or increase in the lengths of the individual cranks while substantially reducing the chance of connecting rod bearing failure in both spark ignition type and Diesel type engines.

The invention may be more fully described in connection with the accompanying drawings, wherein.

Figures 1, 2:
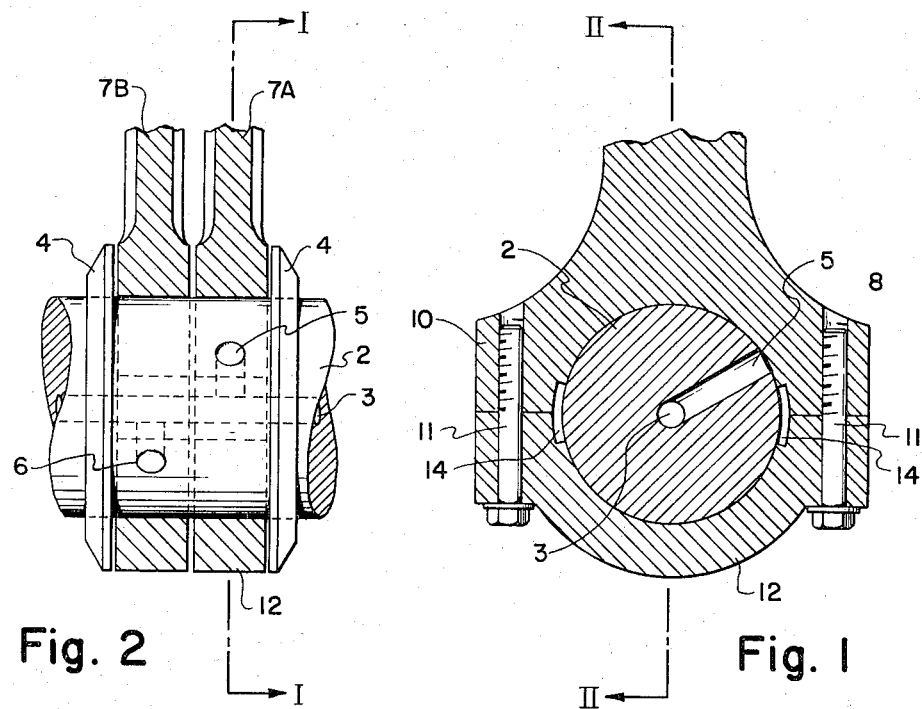
FIG. 1 is a vertical transverse section in the plane of line I—I of FIG. 2 through a portion of a connecting rod and crank which it engages disclosing my invention.
FIG. 2 is a longitudinal vertical section in the plane of line II—II of FIG. 1 with the crank itself in elevation.
Figure 3:
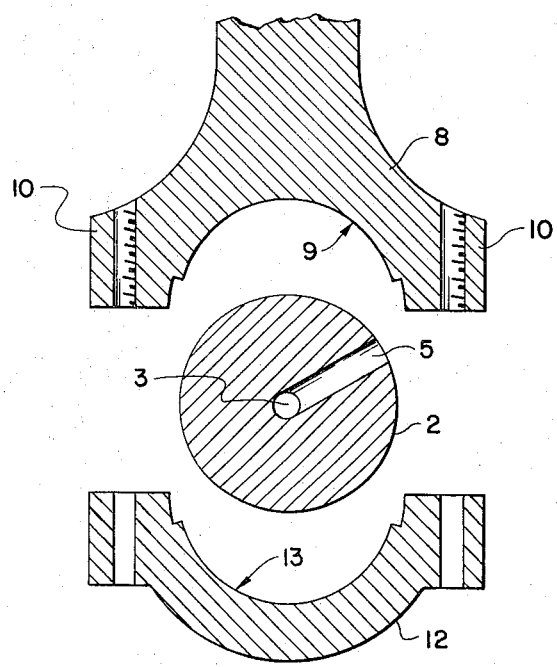
FIG. 3 is an exploded view of the parts as shown in FIG. 1.

As disclosed in my copending application hereinabove referred to, a multiple cylinder engine has a single crank shaft formed with a plurality of cranks disposed at various angles about the center of rotation of the crank shaft itself. The cylinders may be "in-line" or they may be in a so-called "V" arrangement. In the in-line arrangement of the cylinders there is a crank on the crank shaft for each cylinder, while in a V arrangement of the cylinders there are two cylinders, each with a piston and connecting rod for each crank, so that the bearing ends of two connecting rods are side-by-side on a single crank although the two rods themselves extend at divergent angles from the crank. The V engine being the more common one for motor cars, the parts as illustrated in the drawings are for such an engine although so far as this invention is concerned, the parts are essentially the same with in-line cylinders.

Also, as explained in said copending application, lubricating systems commonly used in modern multiple cylinder motor car and other engines include a crank shaft wherein oil under pressure is forced through a continuous duct along the crank shaft, the duct including an axial oil passage through each crank, with a substantially radial outlet port leading from this central passage to each connecting rod. The crank shaft so constructed is well known in the art and forms no part per se of the present invention, and therefore has not been disclosed as such in the drawings, which show only a portion of a single crank comprising part of such a shaft.

In the drawings 2 designates a single crank portion of such a crank shaft; 3 is the axial oil circulating passage, and 4 are confining rings on the crank. This is a usual or typical crank construction. There are at least one, and in this instance two, oil discharge ports 5 and 6 extending from the passage 3 to the periphery of the crank, since in this instance there are two connecting rods engaging a single crank, but the two passages are angularly offset from each other as indicated in FIG. 2.

For the most part, the connecting rods designated generally as $7^A$ and $7^B$ are of conventional shape and the upper ends which engage the wrist pins of their respective pistons, as well as the pistons themselves, are not shown.

The crank-engaging end, or what may be sometimes referred to as the lower end, has the usual integral enlarged bearing portion 8 of a generally yoke-like shape with a semicircular recess 9 that extends halfway about the crank. Portion 8 has lateral extensions 10 at each side of the recess which are bored and threaded to receive bolts 11 by which a separate matching cap end 12 of the connecting rod is removably secured to the bearing end of the body of the rod in the usual manner. This cap has a generally semicircular recess 13 that confronts the recess 11 of the main body of the rod.

This construction is different from the usual connecting rod, in that first the semicircular portions of the two parts provide diametrically opposed integral quadrants, one in the rod terminal and one in the cap, each of which has a working fit about the crank so that there is and can be no insert or replaceable liner, and no eccentricity in the contacting surfaces as usually provided in such liners. In addition to this the bearing surfaces of both the main rod and of the cap are rabbetted back from the parting line between the two members to provide a single groove 14 extending axially of the connecting rod at each side of the crank shaft. Except for these two grooves, which are located on opposite sides of the crank, where they are 180° from center-to-center and so located with reference to the crank that they are centered 90° to each side of a position where the crank and connecting rod are on dead center (the line of dead center as viewed in FIG. 1 coinciding with the line II—II appearing on that figure), the two integral quadrants provide continuous bearing surfaces capable of withstanding heavy impacts at the points of heaviest pressure. The grooves 14 are positioned where the thrust or pressure between the crank and the connecting rod is minimal so that the metal in these quadrants and their rabbetted edges are not subjected to heavy impacts or pressure like that to which the metal in the other two quadrants is subjected.

The connecting rod, like the crank shaft, is in the case, as it usually is, of a strong, hard steel, or steel alloy. Lubricant is supplied to the contacting surfaces of the crank and connecting rod as an oil port, in this case 5 or 6 moves by rotation of the crank relative to the connecting rod into register with one of the grooves 14, that is once to each groove with each rotation of the crank relative to its connecting rod.

Because effective lubrication is supplied to the contacting surfaces of the crank and connecting rod in this way, no looseness is required over and above a working fit and a softer bearing liner becomes unnecessary. As a result, substantially higher compression ratios are possible without increase of weight or dimensions than can be used where deformation of a liner imposes a substantial limitation on exposure to high compression forces.

Thus, by eliminating the liner which was originally adopted because of the lack of effective lubrication without it and the provision of the oil grooves in the quadrants where pressure is minimal, it becomes practical to use higher octane fuels which are slower burning and have a higher ignition temperature with improved and cleaner combustion and efficiency. For example diluting "regular" gasoline with 20 percent or more of methyl or ethyl alcohol, clean-burning fuel is provided without resort to any kind of afterburner, while greater efficiency and increased miles per gallon of fuel results.

It may be desirable to electroplate the crank itself with chrome or other hard metal since this may remove barely visible or microscopic score lines that may remain on the crank shaft, and this could also or alternatively be done on the bearing contacting surfaces of the connecting rod. It may also be noted, as explained in said copending application, that with a conventional crank shaft for multi-cylinder engines with the cranks at diverse angles to one another, as one or two ports are moving away from register with the oil grooves in the connecting rods, another or two other ports will be opening and since the grooves in this portion of the lubricating system provide the only relief passages in the connecting rod bearings for the escape of oil, the escape passages for the flow of oil, while constantly changing from one connecting rod or pair of connecting rods, maintain the oil pressure at various speeds reasonable uniform.

In the drawings the grooves, as shown, have a width of approximately 30° and a usual depth is of 0.003–0.004 inch, but this width may desirably be increased to something of the order of 60°, as may best be suited to the capacity and pressure flow rate and/or pressure at which a particular engine is designed to operate, a wider groove perhaps being best used with a lower range of oil pressures.

I claim:

1. A connecting rod for use with a reciprocating piston type of internal combustion engine in which the cranks have an axial lubricant passage therethrough with a radial discharge port designed to discharge lubricant at the periphery of the crank, said connecting rod having a crank engaging terminal comprising a yoke-like integral end of the connecting rod together with a complementary cap member fixed to the yoke-like connecting rod end, the yoke and cap defining an opening in which the crank with which the rod is used is received, the opening having an integral bearing quadrant therein on the yoke-like end and another such quadrant diametrically opposite the first one and integral with the cap, said two quadrants providing a working fit around the crank when it is received in said opening, the two quadrants being spaced from each other by diametrically opposite open-ended cross grooves, the lubricant discharge port in a crank so received in the connecting rod opening being positioned to be closed by the bearing quadrants during the rotation of the crank in the connecting rod but free to momentarily discharge lubricant into said cross grooves at those angles in the rotation of the crank where the port is exposed to one of the grooves.

2. A connecting rod as defined in claim 1 in which the two opposed bearing quadrants have continuously smooth integral bearing surfaces free of any openings or recesses.

3. A connecting rod as defined in claim 1 in which the cap is removably bolted to the yoke-like end of the connecting rod, the cap and end being joined on a plane which passes diametrically through the crank midway between the two bearing quadrants, said cross grooves each being formed partly in the yoke-like end and partly in the cap.

4. A connecting rod as defined in claim 1 in which the connecting rod, by reason of its construction, cannot receive an insert bearing about the crank, but said integral bearing quadrants are exactly fitted to work against the surface of the crank and are of the same metal as the remainder of the connecting rod.

* * * * *